(12) United States Patent
Huh et al.

(10) Patent No.: US 8,485,406 B2
(45) Date of Patent: Jul. 16, 2013

(54) BELT HANGER FOR HELMETS

(75) Inventors: Moon Young Huh, Seoul (KR); William P. Gardner, Appleton, WI (US)

(73) Assignees: Otos Tech Co., Ltd. (KR); William P. Gardner, Appleton, WI (US)

( * ) Notice: Subject to any disclaimer, the term of this patent is extended or adjusted under 35 U.S.C. 154(b) by 203 days.

(21) Appl. No.: 13/160,841

(22) Filed: Jun. 15, 2011

(65) Prior Publication Data

US 2011/0315734 A1    Dec. 29, 2011

(30) Foreign Application Priority Data

Jun. 29, 2010   (KR) .......................... 10-2010-0061915

(51) Int. Cl.
*A42B 3/00*    (2006.01)
*A42B 3/04*    (2006.01)
*A45F 5/02*    (2006.01)

(52) U.S. Cl.
USPC ........... 224/666; 224/241; 224/246; 224/250; 224/268; 224/269; 224/904; 248/316.5; 24/599.5

(58) Field of Classification Search
USPC ................. 224/660, 666, 268–269, 241, 246, 224/250, 904; 248/316.5
See application file for complete search history.

(56) References Cited

U.S. PATENT DOCUMENTS

| 1,007,213 | A | * | 10/1911 | Lau ............................... 24/599.5 |
| 1,212,511 | A | * | 1/1917 | Kropp .............................. 24/3.6 |
| 1,618,831 | A | * | 2/1927 | Kerns .............................. 24/3.6 |
| 2,071,257 | A | * | 2/1937 | Hansen ....................... 248/294.1 |
| 2,236,207 | A | * | 3/1941 | Bowder ....................... 24/601.5 |
| 2,663,027 | A | * | 12/1953 | Posson ............................. 2/237 |
| 2,775,804 | A | * | 1/1957 | Ayoub ............................ 24/3.6 |
| 4,695,026 | A | * | 9/1987 | Medley, Jr. ................. 248/316.5 |
| 6,053,383 | A | * | 4/2000 | Gunderson .................... 224/270 |
| 7,314,153 | B2 | * | 1/2008 | Musarella et al. ............. 224/269 |
| 2003/0024959 | A1 | * | 2/2003 | Armstrong ................. 224/148.4 |
| 2006/0261116 | A1 | * | 11/2006 | Brandeis ....................... 224/671 |

* cited by examiner

*Primary Examiner* — Nathan J Newhouse
*Assistant Examiner* — Scott McNurlen
(74) *Attorney, Agent, or Firm* — Cantor Colburn LLP

(57) ABSTRACT

Disclosed is a plate-shaped heating panel having connecting members fastened to each other by means of resin. The heating panel comprises upper and lower plates integrally formed to face each other so as to form an inner fluid pathway in which heating water flows, a plurality of connecting members, The holes are filled with a melted plastic resin, and the melted plastic resin is integrated with the connecting members by pressing.

2 Claims, 9 Drawing Sheets

BELT HANGER FOR HELMETS

BACKGROUND OF THE INVENTION

1. Field of the Invention

The present invention relates to a belt hanger for helmets, and more particularly to a belt hanger for helmets which enables a worker to easily keep a helmet, which is carried by worker during work performance, in particular, to easily wear and keep a helmet (a welding helmet, a safety helmet, a security helmet (face shield), a safety appliance having a head band, or etc.).

2. Description of the Related Art

In general, helmets (welding helmets, safety helmets, security helmets (face shields), safety appliances having head bands, etc.) are valuable equipment used by persons working at industrial fields. In order to carry a helmet, a worker grips the helmet or fastens the helmet to his/her belt using a head band of the helmet.

In this case, the helmet may be contaminated by foreign substances stuck to the worker's hands or the worker needs to grip the helmet at all times, thus possibly restricting movement of the worker.

SUMMARY OF THE INVENTION

Therefore, the present invention has been made in view of the above problems, and it is an object in accordance with the present invention to provide a hanger for helmets in a novel type which enables a worker to easily carry a helmet and to easily attach and detach the helmet to and from the hanger, prevents the helmet from being easily separated from the hanger, and is easy to keep the helmet.

In accordance with the present invention, the above and other objects can be accomplished by the provision of a belt hanger for helmets including a belt hanging member including a body formed in a C shape, one end of which is opened and the other end of which is bent, an inner latching protrusion formed at a region below the opened end of the body and bent in the inward direction, outer latching protrusions tapered downward and formed at the upper portion of the external surface of the body, and hinge spring prop insertion holes formed at the lower portion of the external surface of the body, a helmet hanging member including a hinge spring prop insertion hole formed at the lower end thereof so as to be connected to the hinge spring prop insertion holes of the belt hanging member, a body rotated about the hinge spring prop insertion hole so as to be opened and closed in a hinged manner, a bent part formed at the central position of the body and bent in the outward direction, and an upper protruding part formed at the upper end of the body, bent in the outward direction and protruding, and a hinge spring prop provided with the surface on which a hinge spring is wound and inserted into the hinge spring prop insertion holes.

BRIEF DESCRIPTION OF THE DRAWINGS

The above and other objects, features and other advantages in accordance with the present invention will be more clearly understood from the following detailed description taken in conjunction with the accompanying drawings, in which.

DETAILED DESCRIPTION OF THE INVENTION

Now, preferred embodiments in accordance with the present invention will be described in detail with reference to the annexed drawings.

The present invention relates to a belt hanger for helmets including a belt hanging member including a body formed in a C shape, one end of which is opened and the other end of which is bent, an inner latching protrusion formed at a region below the opened end of the body and bent in the inward direction, outer latching protrusions tapered downward and formed at the upper portion of the external surface of the body, and hinge spring prop insertion holes formed at the lower portion of the external surface of the body, a helmet hanging member including a hinge spring prop insertion hole formed at the lower end thereof so as to be connected to the hinge spring prop insertion holes of the belt hanging member, a body rotated about the hinge spring prop insertion hole so as to be opened and closed in a hinged manner, a bent part formed at the central position of the body and bent in the outward direction, and an upper protruding part formed at the upper end of the body, bent in the outward direction and protruding, and a hinge spring prop provided with the surface on which a hinge spring is wound so that the upper protruding part of the helmet hanging member is opened and closed under the condition that a helmet is hung on the belt hanger for helmets, and inserted into the hinge spring prop insertion holes so that the belt hanging member and the helmet hanging member are fixed in a connected state.

The belt hanger for helmets in accordance with the present invention is characterized in that a plurality of anti-separation protrusions 13 is formed on the lower surface of a belt hanging member 10. Further, the belt hanger for helmets in accordance with the present invention is characterized in that an upper fastener 50 is additionally mounted on the upper end of the belt hanging member 10.

Figure 1:
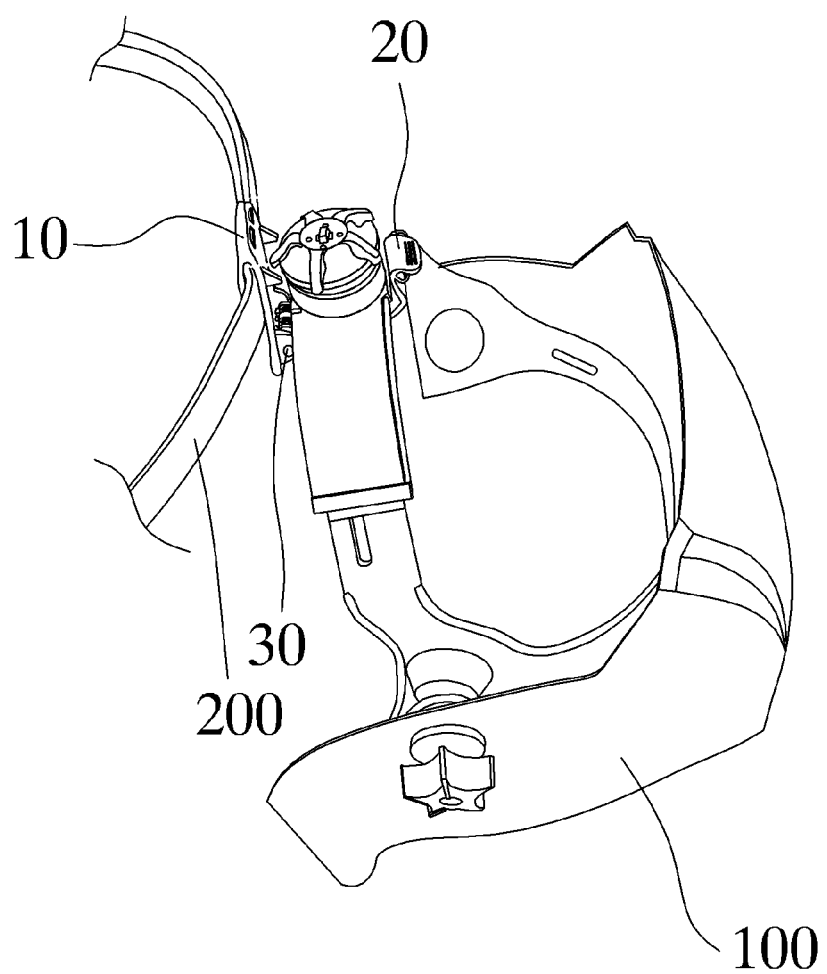
FIG. 1 is a perspective view of a belt hanger for helmets in accordance with the present invention.
Figure 2:
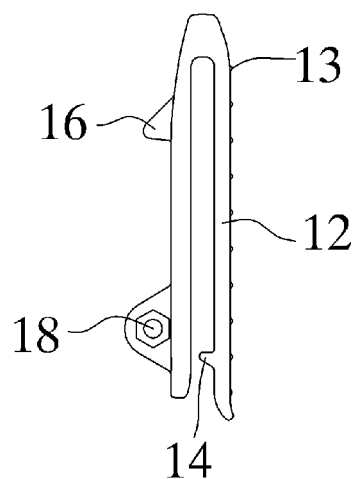
FIG. 2 is a cross-sectional view of the belt hanger for helmets in accordance with the present invention.
Figure 3:
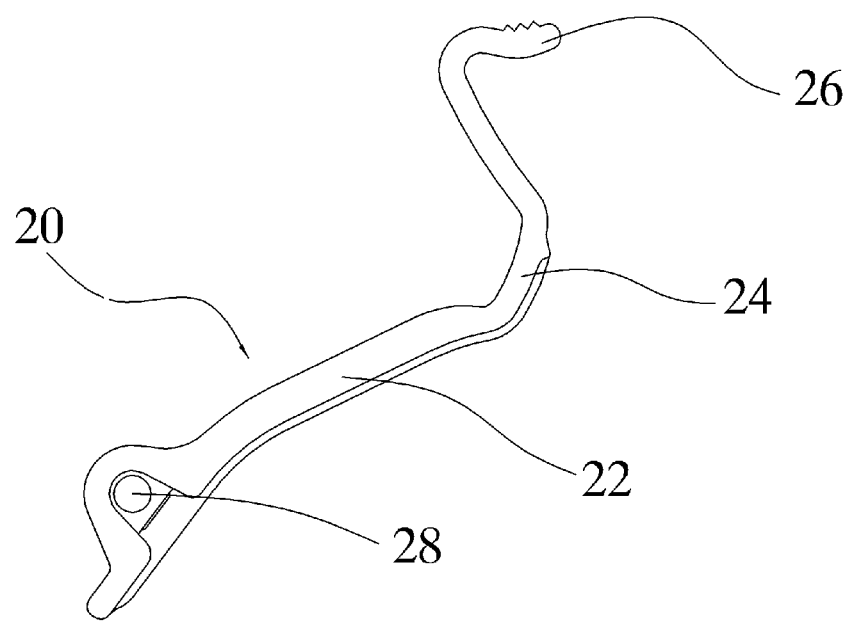
FIG. 3 is a side view of a helmet hanging member of the belt hanger for helmets in accordance with the present invention.
Figure 4:
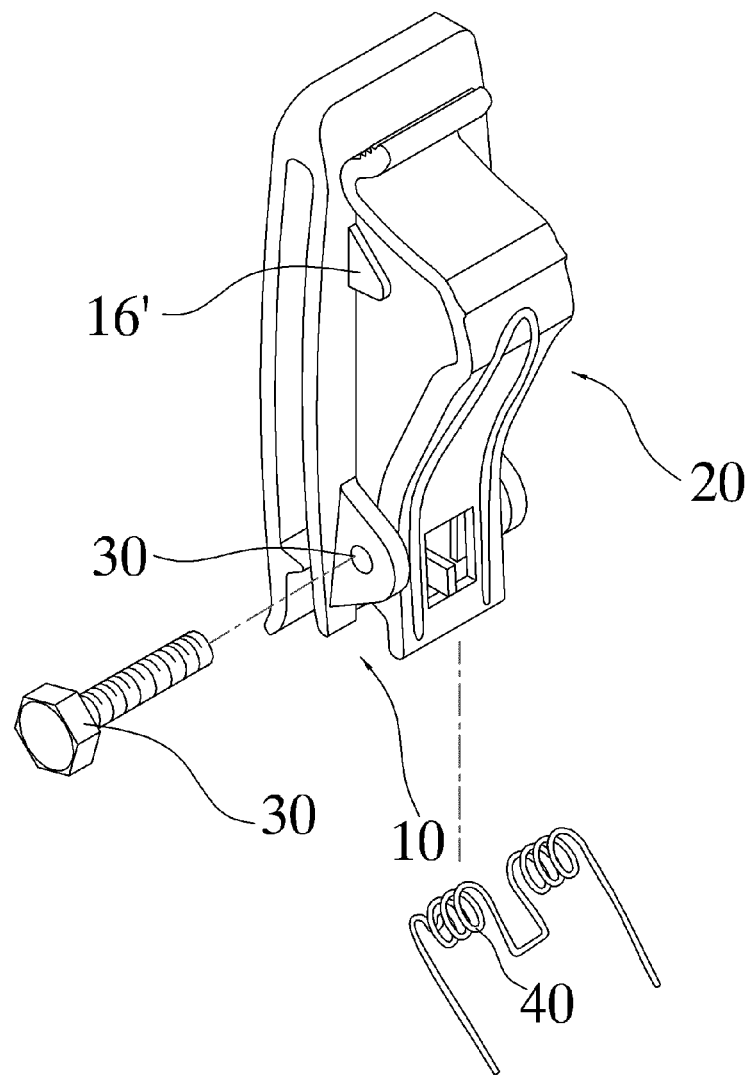
FIG. 4 is an exploded perspective view of the belt hanger for helmets in accordance with the present invention.
Figure 5:
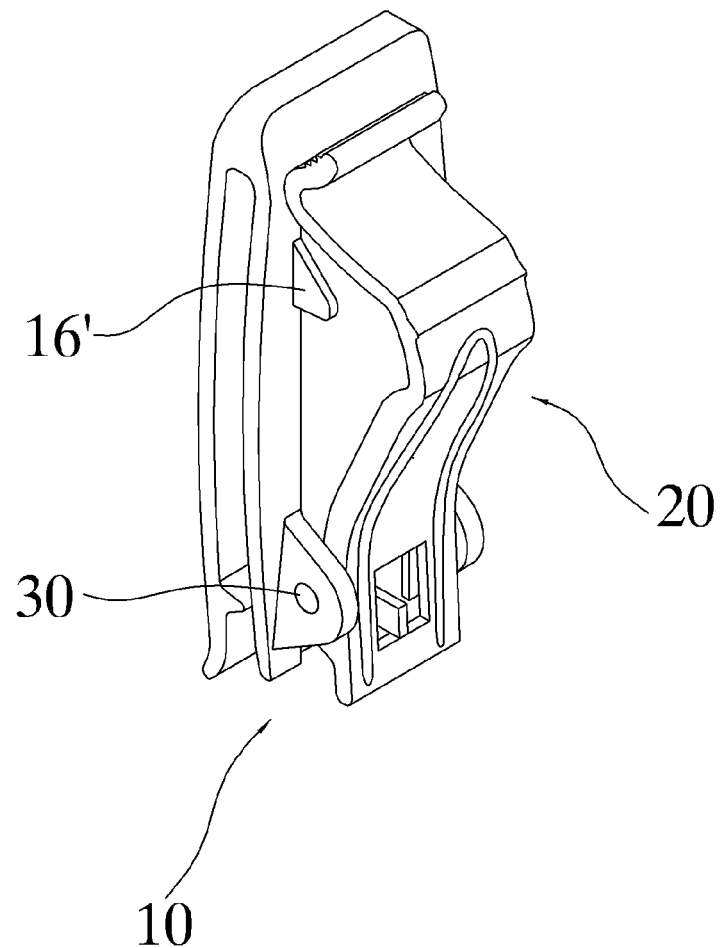
FIG. 5 is a perspective view of the belt hanger for helmets in accordance with the present invention.
Figure 6:
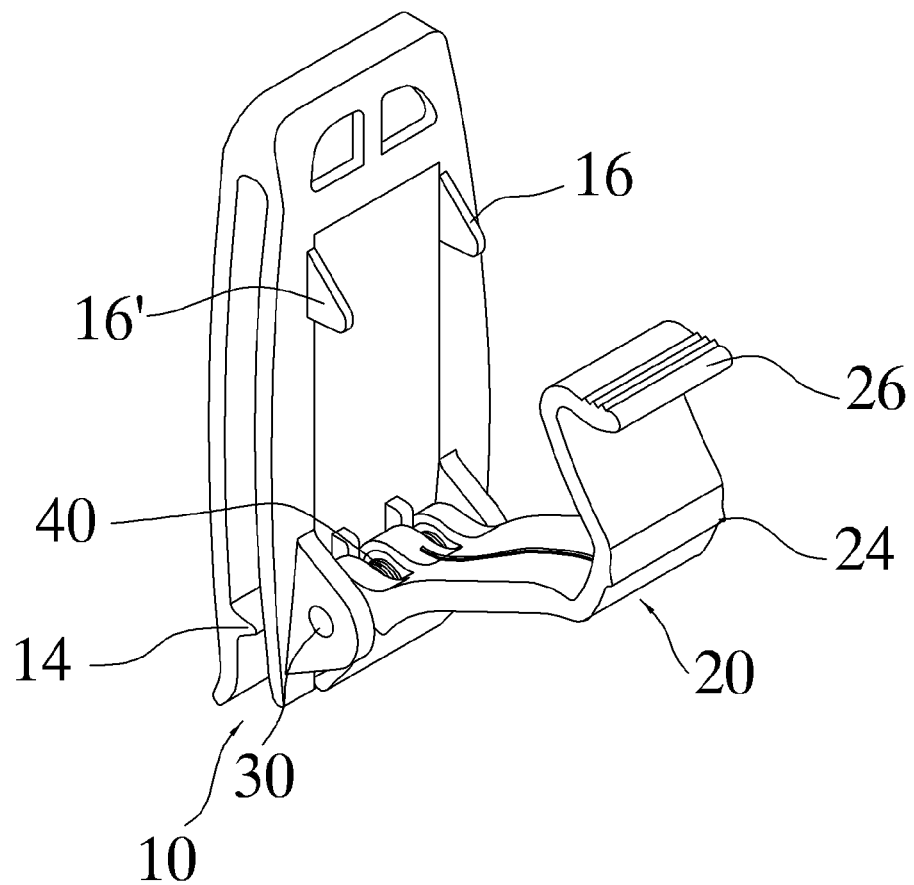
FIG. 6 is a perspective view of the belt hanger for helmets in accordance with the present invention.
Figure 7:
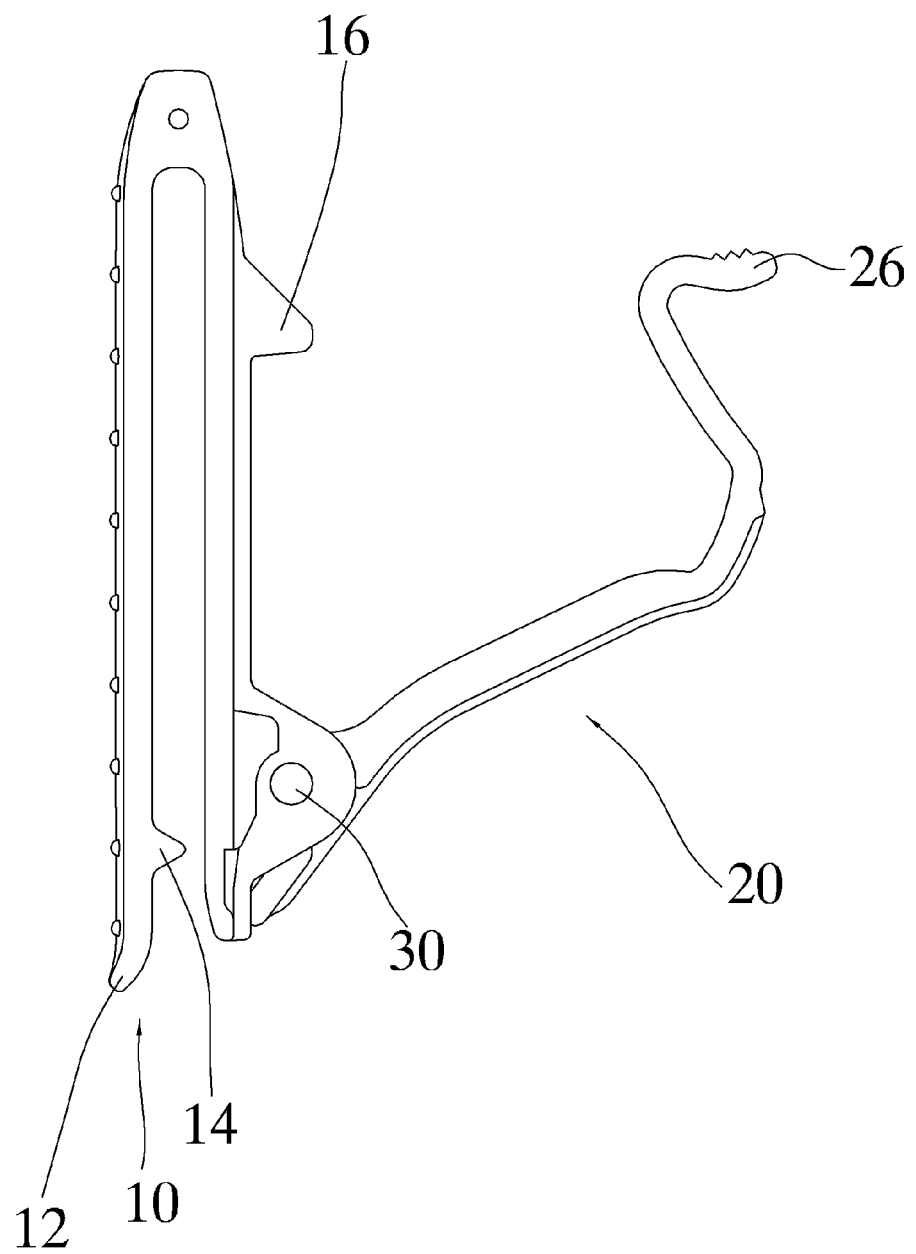
FIG. 7 is a cross-sectional view of the belt hanger for helmets in accordance with the present invention.
Figure 8:
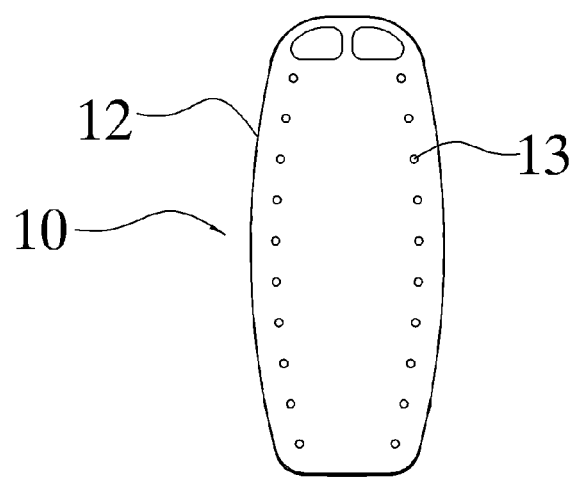
FIG. 8 is a bottom view of the belt hanger for helmets in accordance with the present invention.

As shown in FIG. 1, the belt hanger for helmets in accordance with the present invention is configured such that a helmet 100 is hung on the belt hanger for helmets under the condition that the belt hanger for helmets is fixed to a belt 200. In the belt hanger for helmets in accordance with the present invention, the belt hanging member 10 includes a body 12 formed in a C shape, one end of which is opened and the other end of which is bent, so as to be fixed to the belt 200. In the belt hanger for helmets in accordance with the present invention, an inner latching protrusion 14 formed at a region below the opened end of the body 12 of the belt hanging member 10 is bent in the inward direction and thus serves to prevent the belt hanger for helmets from being separated from the belt 200 when the belt hanger for helmets is fixed to the belt 200. In the belt hanger for helmets in accordance with the present invention, outer latching protrusions 16 and 16', which are tapered downward, are formed at the upper portion of the external surface of the body 12 of the belt hanging member 10 and thus serve to prevent the helmet 100 from being separated from the belt hanger for helmets when the helmet 100 is hung on the belt hanger for helmets. In the belt hanger for helmets in accordance with the present invention, hinge spring prop insertion holes 18 and 18' are formed at the lower portion of the external surface of the body 12 of the belt hanging member 10 and thus serve to fix the belt hanging member 10 and a helmet hanging member 20 in a connected state using a hinge spring prop 30.

In the belt hanger for helmets in accordance with the present invention, a hinge spring prop insertion hole 28 is formed at the lower end of the helmet hanging member 20 so as to be connected to the hinge spring prop insertion holes 18 and 18' of the belt hanging member 10, and a body 22 is formed such that the body 22 is rotated about the hinge spring prop insertion hole 28 so as to be opened and closed in a hinged manner. A bent part 24 bent in the outward direction is formed at the central position of the body 22, and an upper protruding part 26 bent in the outward direction and protruding is formed at the upper end of the body 22.

In the belt hanger for helmets in accordance with the present invention, a hinge spring 40 is wound on the surface of the hinge spring prop 30 so that the upper protruding part 26 of the helmet hanging member 20 is opened and closed under the condition that the helmet 100 is hung on the belt hanger for helmets, and the hinge spring prop 30 is inserted into the hinge spring prop insertion holes 18, 18' and 28 so that the belt hanging member 10 and the helmet hanging member 20 are fixed in the connected state.

Preferably, in the belt hanger for helmets in accordance with the present invention, the upper fastener 50 is additionally mounted on the upper end of the belt hanging member 10. In the belt hanger for helmets in accordance with the present invention, a rotary connection hole 52 is formed at the lower end of the upper fastener 50 and thus serves to fix the upper fastener 50 to the upper end of the belt hanging member 10 in a hinged manner and to enable the upper fastener 50 to be opened and closed in the upward and downward direction. Further, a latching protrusion 56 is formed at the upper end of the upper fastener 50, and is thus connected to the upper protrusion part 26 of the helmet hanging member 20 and serves to prevent the helmet 10 from being separated from the belt hanger for helmets when the helmet 100 is hung on the belt hanger for helmets in accordance with the present invention. Alternatively, in the belt hanger for helmets in accordance with the present invention, an upper fastener 50' provided with a connection hole 52 formed at the lower portion thereof is provided, and the upper protruding part 26 formed at the upper end of the helmet hanging member 20 is inserted into the connection hole 52 when the upper fastener 50' is opened in the upward direction, thereby enabling the upper fastener 50' to be fixed in the upward direction.

Figure 9:
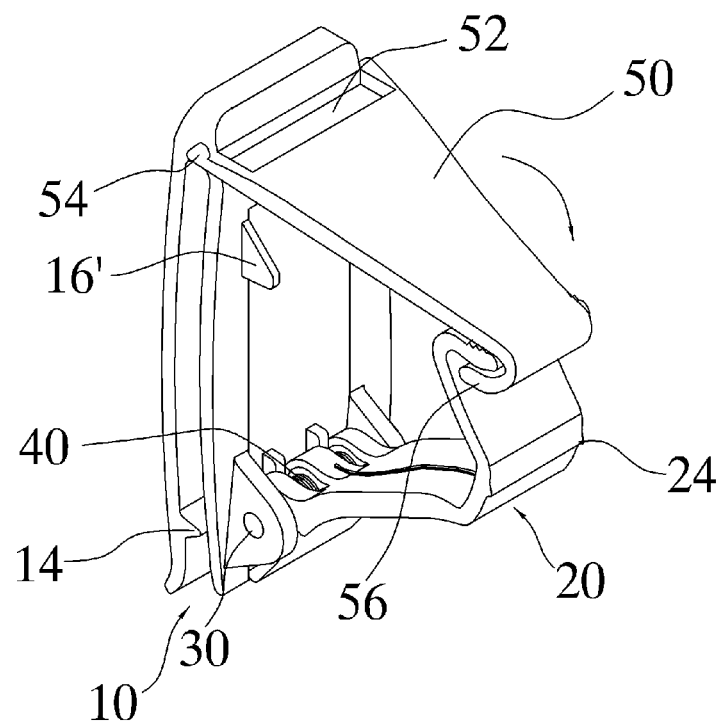
FIG. 9 is a perspective view illustrating an upper fastener formed of rubber in accordance with one embodiment in accordance with the present.
Figure 10:
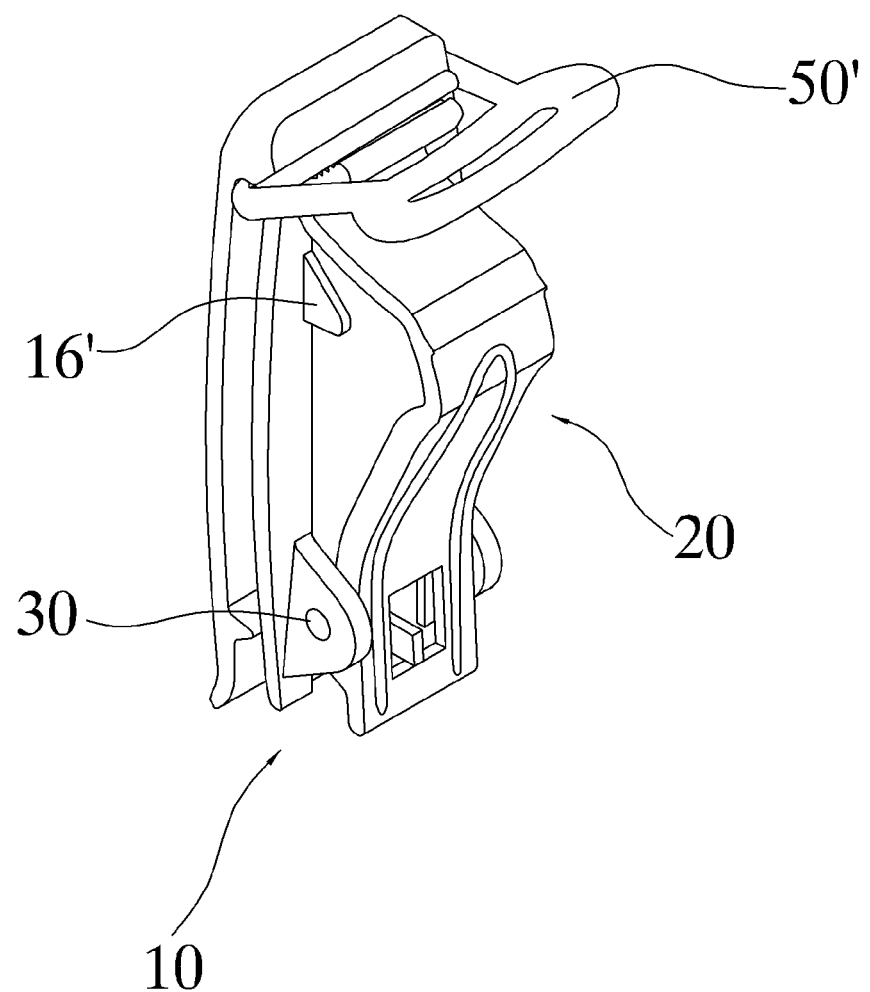
FIG. 10 is a perspective view illustrating an upper fastener formed of rubber in accordance with another embodiment in accordance with the present.
Figure 11:
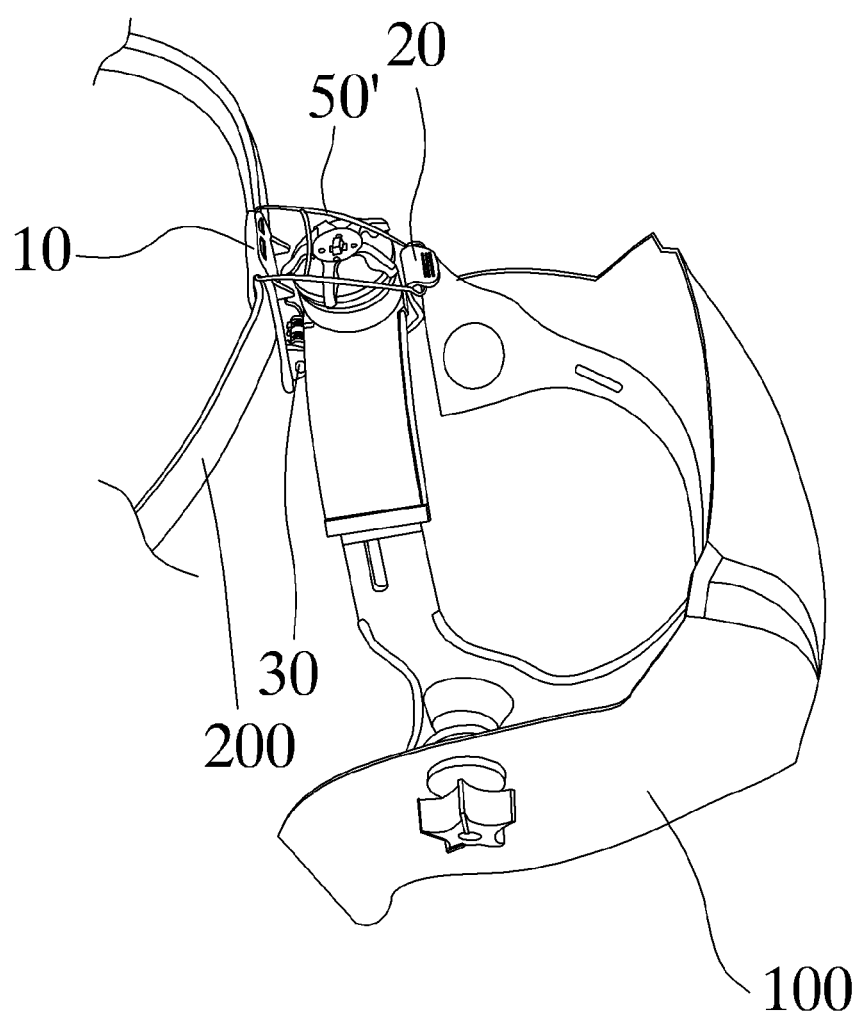
FIG. 11 is a view illustrating a state in which a helmet is hung on the belt hanger for helmets in accordance with the present.

FIG. 11 illustrates a state in which the belt hanger for helmets in accordance with the present invention is fixed to the belt 200. The upper fastener 50 or 50' inserted into the upper portion of the belt hanging member 10 in accordance with the present invention prevents the helmet 100 from being separated from the belt hanger for helmets during movement or work at a high height under the condition that the helmet 100 is hung on the belt hanger for helmets. The upper fastener 50 shown in FIG. 9 is formed of a hard material, such as plastic or a synthetic resin, and the upper fastener 50' shown in FIGS. 10 and 11 is formed of an elastic material (such as silicon, rubber or a band) so as to prevent the helmet 100 from being easily separated from the belt hanger for helmets.

The belt hanger for helmets in accordance with the present invention enables a helmet (a welding helmet, a safety helmet, a security helmet (face shield), a safety appliance having a head band, such as a motorcycle helmet, an inline skate helmet, and a bicycle helmet), sunglasses, sports glasses, ski goggles, and work goggles to be hung thereon, and various color, size and design modifications of the belt hanger for helmets are possible according to purpose, without departing from the scope and spirit of the invention as disclosed in the accompanying claims.

The belt hanger for helmets in accordance with the present invention is fixed to a belt and a helmet is hung on the belt hanger for helmets while the helmet is carried, thereby enabling the helmet to be easily attached to and detached from the belt hanger for helmets and to be conveniently worn by a worker without any separate case, and preventing the helmet from being easily separated from the belt hanger for helmets due to external impact and from being lost or stolen.

As apparent from the above description, the present invention provides a belt hanger for helmets which is fixed to a belt and then allows a helmet to be hung on the belt hanger for helmets while the helmet is carried, thereby enabling the helmet to be easily attached to and detached from the belt hanger for helmets and to be conveniently worn by a worker without any separate case, and preventing the helmet from being easily separated from the belt hanger for helmets due to external impact.

Further, the belt hanger for helmets in accordance with the present invention enables persons working at industrial fields to conveniently carry and safely keep helmets, thus being useful in a safety appliance industry.

Although the preferred embodiments in accordance with the present invention have been disclosed for illustrative purposes, those skilled in the art will appreciate that various modifications, additions and substitutions are possible, without departing from the scope and spirit of the invention as disclosed in the accompanying claims.

What is claimed is:

1. A belt hanger for helmets comprising: a belt hanging member formed in a C shape, one end of which is opened and the other end of which is bent, an inner latching protrusion formed at a region below the opened end of the belt hanging member and bent in the inward direction, outer latching protrusions tapered downward and formed at the upper portion of the external surface of the belt hanging member, and hinge spring prop insertion holes formed at the lower portion of the external surface of the belt hanging member;

a helmet hanging member including a hinge spring prop insertion hole formed at the lower end thereof so as to be connected to the hinge spring prop insertion holes of the belt hanging member, the helmet hanging member rotated about the hinge spring prop insertion hole so as to be opened to move the helmet hanging member away from the belt hanging member and closed to move the helmet hanging member against the belt hanging member in a hinged manner, a bent part formed at the central position of the helmet hanging member and bent in the outward direction, and an upper protruding part formed at the upper end of the helmet hanging member, bent in the outward direction and protruding;

a hinge spring prop provided with the surface on which a hinge spring is wound so that the upper protruding part of the helmet hanging member is opened and closed under the condition that a helmet is hung on the belt hanger for helmets, and inserted into the hinge spring prop insertion holes so that the belt hanging member and the helmet hanging member are fixed in a connected state; and a rigid upper fastener pivotally coupled at the upper end of the belt hanging member to pivot with respect to the belt hanging member and the helmet hanging member, the rigid upper fastener configured to couple with the upper protruding part of the helmet hanging member to fix the helmet so as to prevent the helmet from being separated from the helmet hanging member.

2. The belt hanger for helmets according to claim 1, wherein a plurality of anti-separation protrusions is formed on the lower surface of the belt hanging member.

* * * * *